Figure 2:
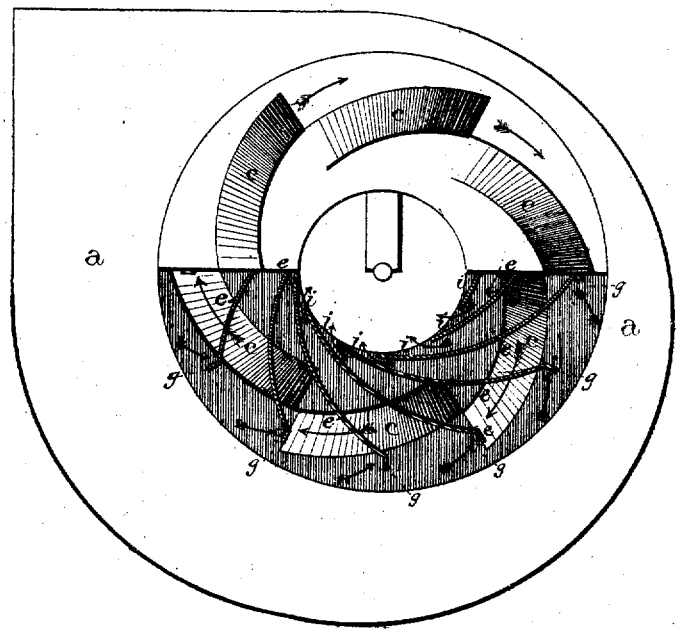

J. TANEY.

Water-Wheels.

No. 5,682. *Fig. 1.* Reissued Dec. 9, 1873.

WITNESSES.
Wm Johnson
W. F. Kendig

INVENTOR.
Jos. Taney
per
F. A. Lehmann,
Atty

AM. PHOTO-LITHOGRAPHIC Co. N.Y. (OSBORNE'S PROCESS)

UNITED STATES PATENT OFFICE.

JOSEPH TANEY, OF BANGOR, MAINE.

IMPROVEMENT IN WATER-WHEELS.

Specification forming part of Letters Patent No. 143,040, dated September 23, 1873; reissue No. 5,682, dated December 9, 1873; application filed December 1, 1873.

*To all whom it may concern:*

Be it known that I, JOSEPH TANEY, of Bangor, in the county of Penobscot and State of Maine, have invented certain new and useful Improvements in Water-Wheels; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of my invention relates to an improvement in water-wheels; and it consists in the peculiar arrangement and combination of vents or discharges for the water from the wheel, whereby the water is made to act upon the wheel by impact, pressure, and reaction, so as to utilize its full force, as will be more fully described hereafter.

The accompanying drawings represent my invention.

*a* represents the scroll-casing, in which the wheel is placed. Near the outer edge of both the base and crown plates of this wheel are formed a number of spiral vents, *c*, placed eccentrically to the curve of the wheel, and through which a portion of the water is discharged. These vents curve outwardly, so that as the water passes through them it will exert its power upon the wheel both by a side pressure and by reaction. These vents should be about twice as long as the depth of the wheel. The buckets *e* have their outer ends formed upon a radius of the wheel, as shown at *g*, and then are curved inward toward the center, at a tangent to the line of the wheel, leaving the central vents *i* between their inner ends, through which about one-half of the volume of water received by the wheel is discharged.

In case the supply or head of water is limited, one of the sets of vents, either in the base or crown plate may be dispensed with.

The water first acts upon the wheel by impact upon the buckets, and then, as it fills the wheel and makes a pressure upon its rim, the curved vents above and below give vent to this pressure and free the wheel from the reaction of the water in the scroll-passage. The curve of the buckets and vents is such that the impact, pressure, and reaction of the water are utilized to their full extent.

Having thus described my invention, I claim—

1. A water-wheel having the central discharges *i* and the discharges *c* through the base or crown plate, substantially as set forth.

2. A water-wheel having the central discharges *i* and the curved vents *c* through its crown and base plates, substantially as specified.

In testimony that I claim the foregoing I have hereunto set my hand and seal this 20th day of November, 1873.

JOSEPH TANEY. [L. S.]

Witnesses:

CHAS. V. LORD,
WILLIAM C. HOLT.